US008573350B2

(12) United States Patent
Abro et al.

(10) Patent No.: US 8,573,350 B2
(45) Date of Patent: Nov. 5, 2013

(54) CONSOLE ASSEMBLY FOR USE IN AN AUTOMOTIVE VEHICLE

(75) Inventors: Lauren M. Abro, Farmington Hills, MI (US); Jeffrey John Pehler, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/419,050

(22) Filed: Mar. 13, 2012

(65) Prior Publication Data

US 2013/0241229 A1 Sep. 19, 2013

(51) Int. Cl.
*B60K 20/04* (2006.01)
*B60N 3/04* (2006.01)

(52) U.S. Cl.
USPC ....... 180/336; 180/315; 296/24.34; 296/37.8; 296/97.23; 74/18.1

(58) Field of Classification Search
USPC .............. 180/315, 336; 74/18.1, 473.24, 566; 296/24.34, 39.1, 37.8, 97.23
See application file for complete search history.

(56) References Cited

U.S. PATENT DOCUMENTS

| | | | | |
|---|---|---|---|---|
| 3,998,109 A * | 12/1976 | O'Brien | ...................... | 74/473.23 |
| 4,191,064 A * | 3/1980 | Houk et al. | ................. | 74/473.23 |
| 4,788,806 A * | 12/1988 | Sease | ............................... | 52/222 |
| 4,793,620 A * | 12/1988 | Karch | ............................ | 277/636 |
| 4,991,457 A * | 2/1991 | Chen | .......................... | 74/473.36 |
| 5,015,034 A * | 5/1991 | Kindig et al. | ................. | 297/227 |
| 5,150,406 A * | 9/1992 | Dunchock | ..................... | 379/446 |
| 5,615,576 A | 4/1997 | Kataumi et al. | | |
| 5,680,799 A | 10/1997 | Nukatsuka et al. | | |
| 5,848,855 A | 12/1998 | Roossien | | |
| 5,855,182 A * | 1/1999 | Kline et al. | .................. | 116/28.1 |
| 5,979,263 A | 11/1999 | Tomida et al. | | |
| 6,182,530 B1 | 2/2001 | Hattori et al. | | |
| 7,017,436 B2 * | 3/2006 | Winchell | ........................ | 74/18.1 |
| 7,690,708 B2 | 4/2010 | Lota et al. | | |
| 7,866,722 B2 | 1/2011 | Shibata et al. | | |
| 8,186,735 B2 * | 5/2012 | Maceri et al. | ............... | 296/37.14 |
| 2004/0069079 A1 | 4/2004 | K. Winchell | | |
| 2006/0214462 A1 * | 9/2006 | Cowelchuk et al. | ............ | 296/70 |
| 2011/0197697 A1 | 8/2011 | Morrissett et al. | | |

FOREIGN PATENT DOCUMENTS

| | | |
|---|---|---|
| EP | 0875699 A1 | 6/2003 |
| GB | 2310901 A | 9/1997 |
| JP | 58093645 A | 6/1983 |
| JP | 6122346 A | 5/1994 |

(Continued)

*Primary Examiner* — Joseph Rocca
*Assistant Examiner* — Darlene P Condra
(74) *Attorney, Agent, or Firm* — Gifford, Krass, Sprinkle, Anderson & Citkowski, P.C.

(57) ABSTRACT

A console assembly having a seal, such as a bead, operable to prevent water seeping though the opening from coming into contact with the electrical component is provided. A top panel of the console assembly includes an opening, and a stick shift disposed within the opening. The shifter housing is disposed within the center console is configured to hold an electrical component. An elongated member extends outwardly from the first shifter housing side wall towards the first cover wall. The seal is disposed above the electrical component. The seal is engaged between the first cover wall and the elongated member. A bead biases a portion of carpet against the side wall to retain the carpet in an upright position and prevent moisture from entering the shifter housing.

16 Claims, 4 Drawing Sheets

(56) References Cited

FOREIGN PATENT DOCUMENTS

| | | | |
|---|---|---|---|
| JP | 8156842 A | 6/1996 | |
| JP | 8295123 A | 11/1996 | |
| JP | 9020195 A | 1/1997 | |
| JP | 9095154 A | 4/1997 | |
| JP | 9166202 A | 6/1997 | |
| JP | 9267696 A | 10/1997 | |
| JP | 2000016344 A | 1/2000 | |
| JP | 2009166599 A | 7/2009 | |

* cited by examiner

CONSOLE ASSEMBLY FOR USE IN AN AUTOMOTIVE VEHICLE

FIELD OF THE INVENTION

The invention relates to a console assembly for use in an automotive vehicle. More particularly the invention relates to a console assembly having a seal operable to prevent water, liquid or condensation from dripping onto electrical components.

BACKGROUND OF THE INVENTION

Console assemblies may be found in the driver cabin space of an automotive vehicle and are generally disposed between the front passenger and driver seat. Many console assemblies include a cover panel having an opening for a stick shift. The stick shift is operable to change the engine transmission from various driving states such as park, reverse, neutral or drive. Beneath the stick shift is a shifter housing which stores electrical components operatively connected to the stick shift. Accordingly it remains desirable to have a console assembly wherein water seeping through an opening of the console is prevented from intruding into the shifter housing.

SUMMARY OF THE INVENTION

According to one aspect of the invention a console assembly for use in an automotive vehicle is provided. The console assembly includes center console having a top panel. The top panel has an opening. A stick shift is disposed within the opening. The console assembly further includes a pair of cover side walls. The cover side walls are mounted to the side edges of the top panel.

The console assembly is mounted onto a center console frame disposed between the front passenger and driver seat of the vehicle. The center console frame includes a first wall spaced apart a second wall. The first and second walls disposed along generally parallel axes extending between the front passenger and driver seat. The first wall is closer to the driver seat, relative the second wall. The first and second walls of the center console frame are configured to support and engage each of the cover side walls of the center console so as to fix the center console in place with respect to the driver and front passenger seats.

The console assembly further includes a shifter housing disposed beneath the top panel of the center console. The shifter housing includes a top wall having a first opening from which the stick shift extends though. The shifter housing is configured to hold an electrical component.

The shifter housing includes a pair of shifter housing side walls. The shifter housing side walls are spaced apart from each other and extend generally downwardly from a top wall of the shifter housing. The shifter housing side wall adjacent the driver seat includes a second opening for providing access to the electrical components.

The shifter housing further includes a front wall and a back wall spaced apart from the front wall. Both the front and back walls extend downwardly from opposing edges of the top wall of the shifter housing and may be fixed to the vehicle body. The front wall extends downwardly from a front side edge of the top wall and the back wall extends downwardly from a back side edge of the top wall. The shifter housing side walls extend between opposing distal edges of the front and back wall so as to partially enclose electrical components stored within the shifter housing.

The shifter housing includes an elongated member disposed on an outer surface of the shifter housing side wall facing the drive seat. The elongated member extends outwardly from the side wall towards the driver's seat. The elongated member is disposed above the second opening relative to the vehicle floor.

The console assembly includes a seal operable to prevent liquids from seeping into an opening of a side wall of the shifter housing. The seal is disposed between an inner surface of one of the center side walls of the console assembly and the shifter housing side wall facing the driver seat In a first preferred embodiment, the seal is formed by a portion of carpet pinched between a cover side wall and the first side wall of the shifter housing. The carpet is mounted onto the center console frame and includes a shaped portion. The shaped portion includes features operable to prevent the carpet from slipping below the elongated member of the shifter housing.

For example, the feature may include a bend formed along a portion of the carpet disposed above the elongated member. The bend is convex with respect to the side wall of the console assembly. Accordingly the bend extends radially away from the electrical component so. The bend is disposed between a bottom portion and a top portion of the shaped portion of carpet. The bottom portion extends generally upright along an axis and the top portion extends generally upright and is offset from the axis. Accordingly the weight of the carpet will apply a load against the bend so as to help ensure that the bend remains above the elongated member thus preventing the carpet from slipping past the elongated member.

Thus in instances where gravity urges the shaped portion of the carpet downwardly, the bend catches the distal end of the elongated member so as to hold the shaped portion generally upright and above the elongated member. Further, the elongated member biases the shaped portion of carpet against the side wall so as to hold the portion of carpet generally upright. Accordingly a first portion of the shaped portion of carpet is displaced or held above the elongated member and a bottom portion of the shaped portion of carpet is disposed beneath the elongated member.

The shaped portion of carpet has a length extending between the front and back walls of the housing. The elongated member of the shifter housing includes a distal edge. The distal edge runs along a length also extending between the front and back walls of the housing so as to be commensurate with the length of a portion of carpet. The distal edge of the elongated member is in contact with an inner surface of the portion of carpet so as to hold the carpet in place and bias the carpet outwardly against the inner surface of the portion of carpet.

The shaped portion may further include a bead. The bead may be formed at the bottom end of the bend and is operable to help hold the shaped portion above the elongated member. The bead is a generally resilient concave shape operable to bias the portion of carpet against the inner surface of the side wall.

The elongated member further includes a front edge and a back edge. The front edge is disposed towards the front of the vehicle and the back edge is exposed towards the back of vehicle. The front and back edges extend along an axis generally defined by the width of the vehicle. An outer edge of the elongated member extends between distal ends of the front and back edges and is in contact with the shaped portion of carpet.

In a second preferred embodiment the seal is formed by the engagement of a gripper with the elongated member. The elongated member is disposed on one of either a side panel of the housing or the side wall. The gripper is disposed on the other of either the side panel of the housing or the side wall. The elongated member includes an outer edge. The outer edge is positively engaged by the gripper. The outer edge extends between the front and back walls of the housing.

The gripper may further include a first member opposite and spaced apart a second member. The first member extends along an axis defined by the width of the vehicle. The second member extends along a second axis generally parallel to the first member. The first and second members are configured to receive a portion of the elongated member and to hold the elongated member therebetween in a pinching manner so as to prevent water from intruding into the shifter housing.

For example, the free end portion of the first and second members may be angled towards each other so as to pinch a portion of the elongated member therebetween and to create a watertight seal so as to prevent water from intruding past the gripper and elongated member and into the shifter housing.

Accordingly, the console assembly is operable to prevent liquids from seeping through the opening of the cover into the electrical components disposed within the shifter housing.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
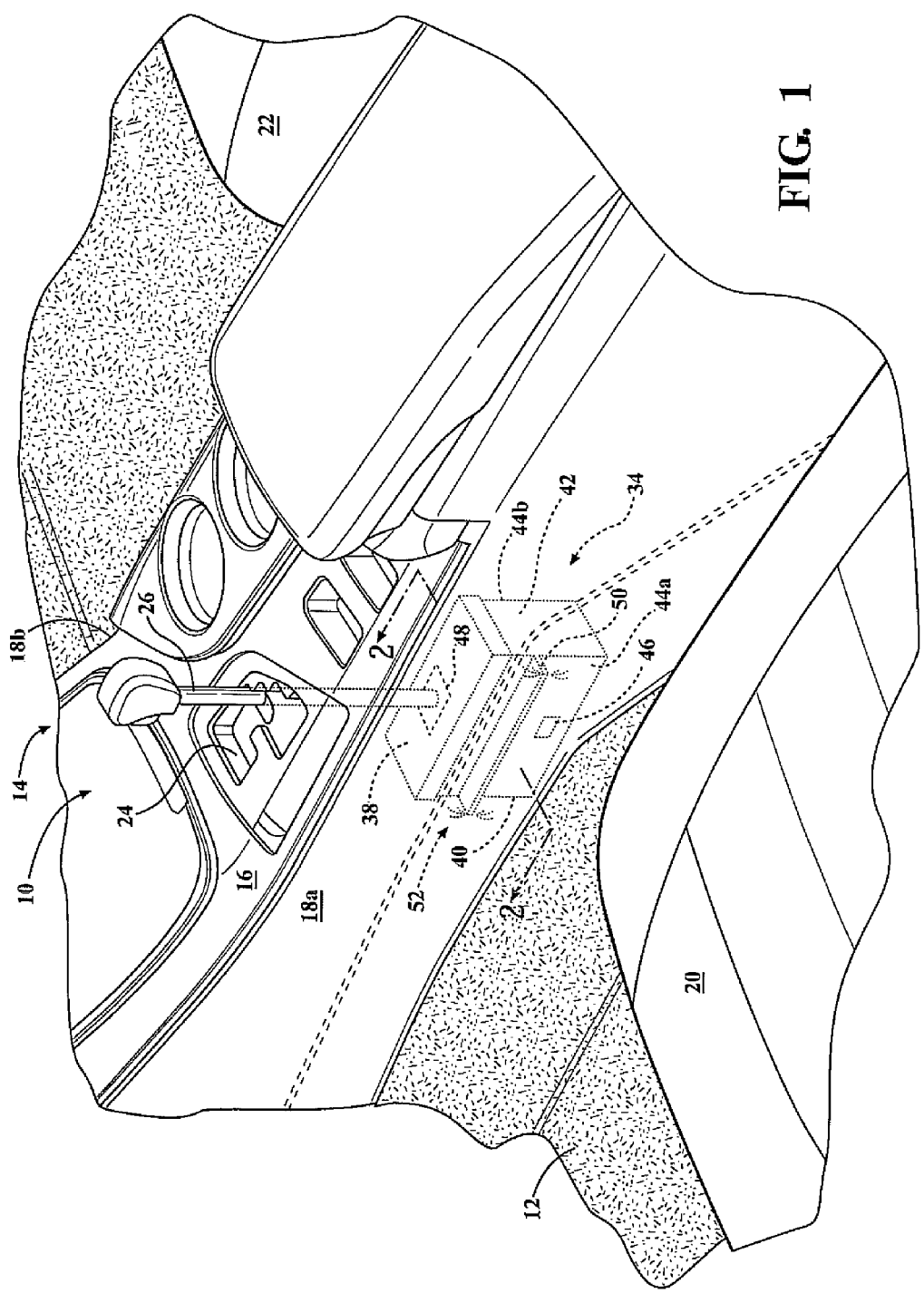
FIG. 1 is a perspective view of a first preferred embodiment of the console assembly.
Figure 2:
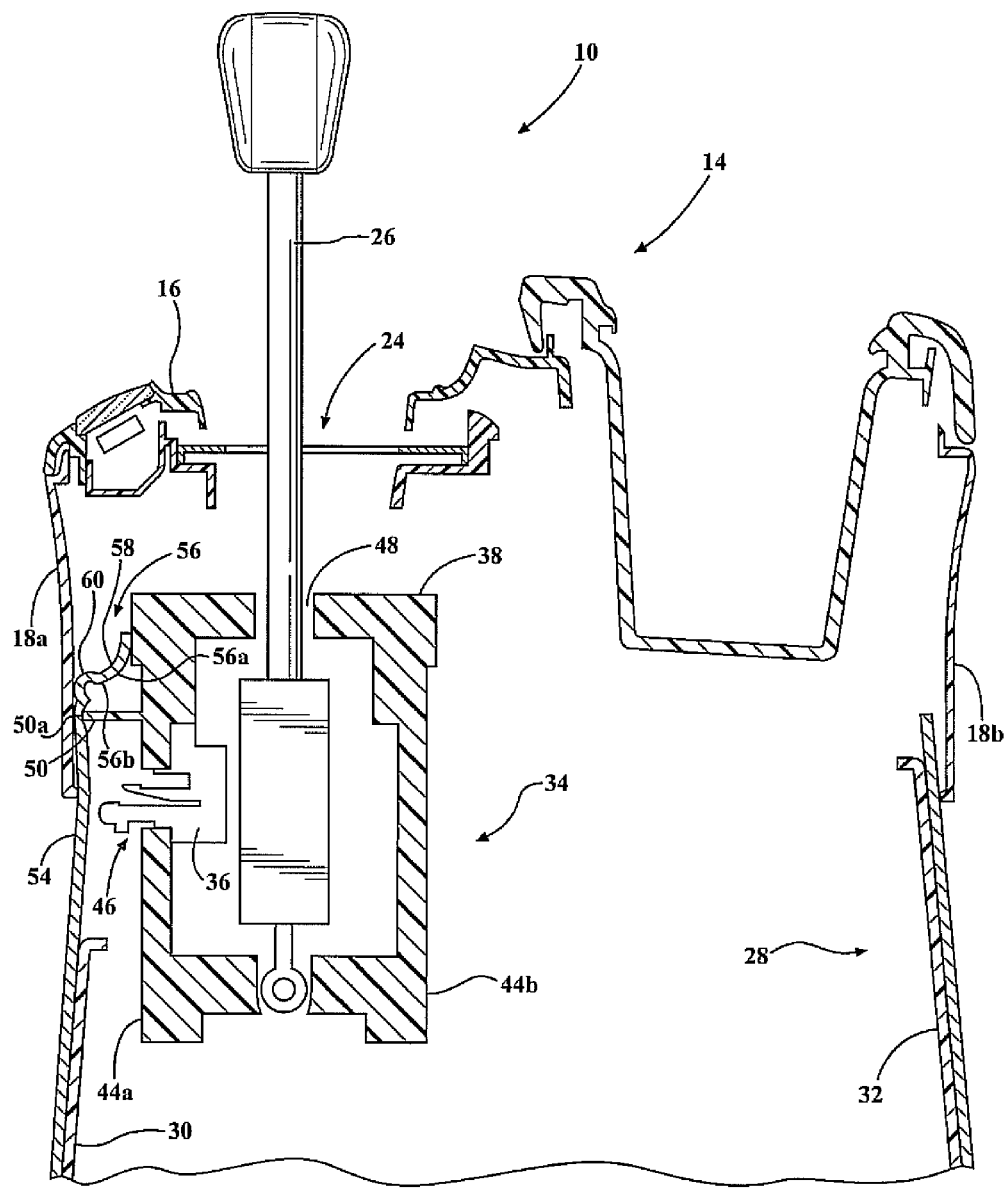
FIG. 2 is a cross-sectional view taken along lines 2-2.

With reference now to FIGS. 1-2, a first preferred embodiment of a console assembly 10 for use in an automotive vehicle is illustrated. The console assembly 10 is mounted to a floor 12 of the automotive vehicle. The center console assembly 10 includes a center console 14. The center console 14 may be formed of a rigid composite material such as plastic.

The center console 14 includes a top panel 16, a first cover wall 18a spaced apart from a second cover wall 18b. The first cover wall 18a is adjacent the driver seat 20 and the second cover wall 18b is adjacent the front passenger seat 22. The top panel 14 includes an opening 24 configured to receive a stick shift 26. The console assembly 10 is mounted between the driver and front passenger seats 20, 22.

The floor 12 includes a center console frame 28 disposed between the front passenger and driver seats 20, 22 of the vehicle. The center console frame 28 may be formed of a durable and rigid material such as metal. The center console frame is a raised portion of the floor 12 and includes a first wall 30 spaced apart from a second wall 32.

The first and second walls 30, 32 are disposed along generally parallel axes and extend between the front passenger and driver seat 20, 22. The first wall 30 is closer to the driver seat 20, relative the second wall 32. The first and second walls 30, 32 of the center console frame 28 are configured to respectively support and engage each of the first and second cover walls 18a, 18b of the center console 14 so as to fix the center console 14 in place with respect to the driver and front passenger seats 20, 22.

A shifter housing 34, is disposed within the center console 14, beneath the top panel 16 and between the first and second cover walls 18a, 18b. The stick shift 26 extends into the shifter housing 34. The shifter housing 34 is configured to hold electrical components 36. The stick shift 26 is operatively connected to the electrical components 36 so as to facilitate the actuation of the vehicle transmission between various driving modes such as park, reverse, neutral and drive.

The shifter housing 34, further includes a top wall 38, a front wall 40 and a back wall 42. The back wall 40 is spaced apart from the front wall 40. The front wall 40 is disposed adjacent the front of the vehicle, and the back wall 42 is disposed rearward of the vehicle with respect to the front wall 40. Both the front and back walls 40, 42 extend downwardly from opposing edges of the top wall 38 of the shifter housing 34 and may be fixed to the vehicle body. The front wall 40 extends downwardly from a front side edge of the top wall 38 and the back wall 42 extends downwardly from a back side edge of the top wall 38.

The shifter housing 34 further includes a pair of shifter housing side walls 44a, 44b. The shifter housing side walls 44a, 44b extend between opposing distal edges of the front and back wall 40, 42 so as to partially enclose electrical components 36 stored within the shifter housing. The shifter housing side wall 44a includes a second opening 46 for providing access to the electrical components 36.

The top wall 38 of the shifter housing 34 includes a first opening 48 configured to guide the stick shift 26 between different transmission modes, e.g. park, reverse, neutral, and drive. The shifter housing 34 includes an elongated member 50 disposed on an outer surface of the shifter housing side wall 44a facing the driver seat 20. The elongated member 50 includes a distal edge 50a and extends outwardly towards the driver seat 20. The second opening 46 is disposed below the elongated member 50, relative to the vehicle floor 12.

The console assembly 10 includes a seal 52 operable to prevent liquids from seeping into the second opening 46 of the shifter housing 34. The seal 52 is disposed between an inner surface of the first cover wall 18a of the center console 14 and the shifter housing side wall 44a, and is disposed above the second opening 46.

In a first preferred embodiment, the seal 52 is formed by carpet 54 pinched between the first cover wall 18a of the console assembly 10 and shifter housing side wall 44a. The carpet 54 generally covers the floor 12 of the vehicle. A portion of the carpet 54 is mounted onto the center console frame 28, and extends upwardly beyond a distal end of the first wall 30, as indicated by the dashed lines in FIG. 1. The carpet further includes a shaped portion 56. The shaped portion 56 includes features operable to prevent the carpet 54 from slipping below the elongated member 50 of the shifter housing 34.

For example, the shaped portion 56 may include a bend 58 formed along a portion of the carpet 54 disposed above the elongated member 50. The bend 58 is convex with respect to the shifter housing side wall 44a. Accordingly the bend extends radially away from the electrical component 36, and forms a generally "S" shape.

The bend 58 is disposed between a bottom portion 56a and a top portion 56b of the shaped portion 56 of carpet. The bottom portion 56a extends generally upright along an axis and the top portion 56b extends generally upright and is offset from the bottom portion 56a. Accordingly the weight of the carpet 54 will apply a load against the bend 58 so as to help ensure that the bend 58 remains above the elongated member 50 thus preventing the carpet 54 from slipping past the elongated member 50.

Thus as gravity urges the shaped portion 56 of the carpet downwardly, the bend 58 catches the distal edge 50a of the elongated member 50 so as to hold the shaped portion 56 generally upright and above both the elongated member 50 and the second opening 46 of the shifter housing 34. Further, the elongated member 50 biases the shaped portion 56 of carpet 54 against the first cover wall 18a so as to hold the shaped portion 56 of carpet generally upright.

The shaped portion 56 of carpet has a length extending between the front and back walls 40, 42 of the shifter housing 34. The distal edge 50a of the elongated member 50 runs along a length also extending between the front and back walls 40, 42 of the shifter housing 34 so as to be commensurate with the length of the carpet 54 pinched between the elongated member 50 and the first cover wall 18a, as indicated by the pinching lines in FIG. 1. The distal edge 50a of the elongated member 50 engages the shaped portion 56 of carpet so as to hold the carpet 54 in place and bias the carpet 54 outwardly against the inner surface of the first cover wall 18a.

The shaped portion 56 may further include a bead 60. The bead 60 may be formed at the bottom end of the bend 58. The bead 60 is a generally resilient convex shape, relative to the shifter housing side wall 44a, and is operable to bias the shaped portion against the inner surface of the first cover wall 18a. The bead 60 may be formed using a heated press so as to create the resilient shape.

Figure 3:
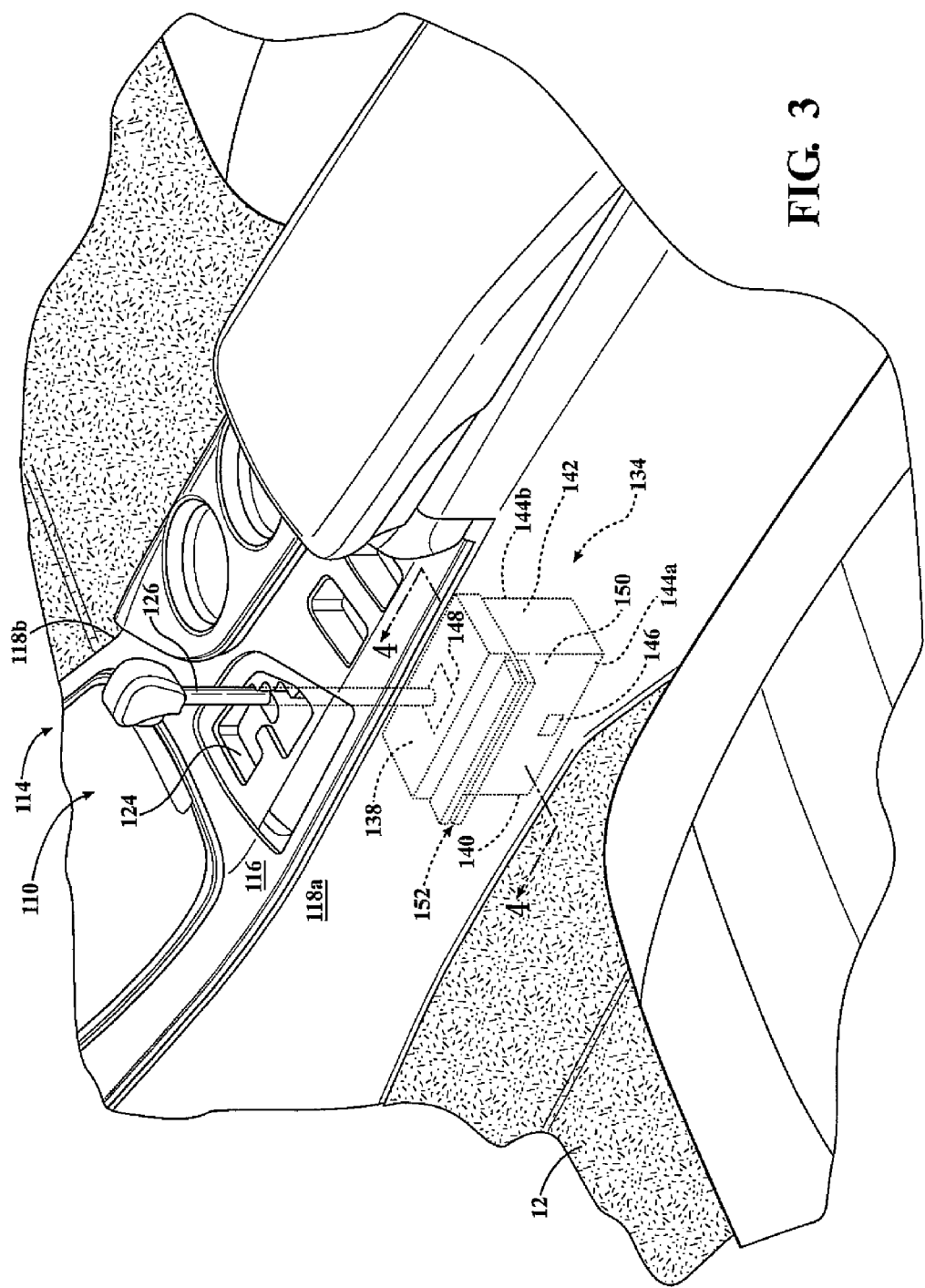
FIG. 3 is a perspective view of a second preferred embodiment of the console assembly.
Figure 4:
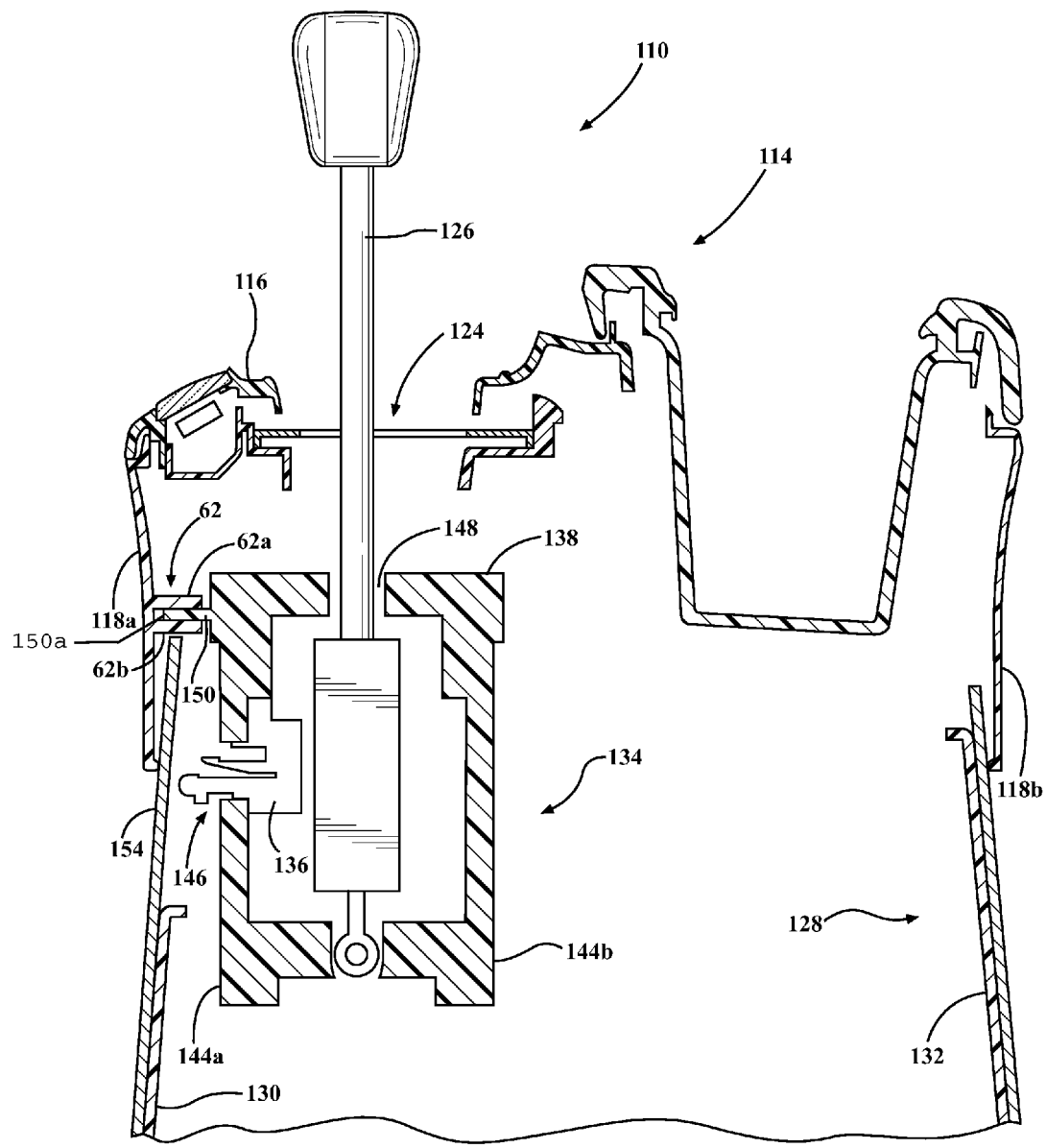
FIG. 4 is a cross-sectional view of FIG. 3 taken along lines 4-4.

With reference now to FIGS. 3 and 4 a second preferred embodiment of the console assembly 110 is provided, wherein like parts are indicated by numerals offset by 100. In a second preferred embodiment the seal 152 is formed by the engagement of a gripper 62 with the elongated member 150. Though the figures show the elongated member 150 disposed on shifter housing side wall 144a, it should be appreciated by those skilled in the art that the elongated member 150 may disposed on one of either the shifter housing side wall 144a or the first cover wall 118a, and the gripper 62 is disposed on the other of either the shifter housing side wall 144a or the first cover wall 118a. The elongated member 150 and the gripper 62 are both disposed above the second opening 146 of the shifter housing 134.

The elongated member 150 includes a distal edge 150a. The distal edge 150a is positively engaged by the gripper 62. The distal edge 150a edge extends between the front and back walls 140, 142 of the shifter housing 134. The distal edge 150a is positively engaged with the gripper 62, and is pinched by the gripper 62 so as to prevent liquids from seeping downwardly into the second opening 146.

For example, the gripper 62 may include a first member 62a opposite and spaced apart from a second member 62b. The first member 62a extends along an axis defined by the width of the vehicle. The second member 62b is disposed beneath the first member 62a and is generally parallel to the first member 62a. The first and second members 62a, 62b are configured to receive a portion of the elongated member 150. The elongated member 150 is held between the first and second members 62a, 62b in a pinching manner so as to prevent water from intruding into the second opening 146 of the shifter housing 134. For example, the free end portion of the first and second members 62a, 62b may be angled towards each other so as to pinch a portion of the elongated member 150 therebetween, creating a watertight seal operable to prevent water from intruding past the gripper 62 and elongated member 150 and into the second opening 146 of the shifter housing 134.

Obviously, many modifications and variations of the present invention are possible in light of the above teachings and may be practiced otherwise than as specifically described while within the scope of the appended claims.

The invention claimed is:

1. A console assembly comprising:
    a center console having a top panel, and a first cover wall, the top panel having an opening;
    a stick shift disposed within the opening;
    a shifter housing disposed within the center console, the shifter housing configured to hold an electrical component, the shifter housing having a first shifter housing side wall spaced apart the first cover wall, and an elongated member extends outwardly from the first shifter housing side wall towards the first cover wall; and
    a seal disposed above the electrical component, the seal is a portion of carpet, the seal engaged between the first cover wall and the elongated member, the elongated member biasing the portion of carpet against the first cover wall, holding the portion of carpet generally upright so as to prevent water seeping though the opening from coming into contact with the electrical component.

2. The console assembly as set forth in claim 1, wherein the shifter housing further includes a front wall and a back wall spaced apart the front wall, both the front and back wall extend downwardly from opposing edges of the top wall portion of the shifter housing, wherein the front wall extends downwardly from a front side edge of the top wall portion and the back wall extends downwardly from a back side edge of the top wall portion.

3. The console assembly as set forth in claim 2, wherein the portion of carpet extends between the front and back walls of the housing.

4. The console assembly as set forth in claim 3, the elongated member includes a distal edge, the distal edge in contact with an inner surface of the portion of carpet, the distal edge extending between the front and back walls of the housing.

5. The console assembly as set forth in claim 1, wherein the portion of the carpet includes a bend, the bend concave with respect to the first shifter housing side wall.

6. The console assembly as set forth in claim 5, wherein a bead is disposed beneath the bend, the bead convex with respect to the side wall.

7. The console assembly as set forth in claim 5, wherein the portion of the carpet includes a bottom portion and a top portion, the bend interconnecting the bottom portion to the top portion, the bottom portion extending generally upright along an axis, the top portion extending generally upright and offset from the axis.

8. The console assembly as set forth in claim 1, wherein the portion of the carpet further includes a bead, the bead disposed above the elongated member, the bead convex with respect to the first shifter housing side wall, the bead biasing against the first cover wall so as to help maintain the portion of carpet between the elongated member and the first cover wall and prevent water from entering the shifter housing.

9. The console assembly as set forth in claim 1, wherein the seal includes a gripper configured to engage the elongated member, the gripper and elongated member disposed above the electrical component.

10. The console assembly as set forth in claim 9, wherein the gripper includes a first member spaced apart and above a second member, the first and second member configured to fittingly receive the elongated member.

11. The console assembly as set forth in claim 10, wherein the shifter housing further includes a front wall and a back wall spaced apart the front wall, both the front and back wall extend downwardly from opposing edges of the top wall portion of the housing, wherein the front wall extends downwardly from a front side edge of the top wall portion and the back wall extends downwardly from a back side edge of the top wall portion.

12. The console assembly as set forth in claim 11, wherein a free end portion of the first and second members are angled towards each other, so as to pinch a portion of the elongated member therebetween.

13. The console assembly as set forth in claim 9, wherein the elongated member includes a distal edge, the distal edge positively engaged with the gripper.

14. A console assembly comprising:
- a center console having a top panel, and a first cover wall, the top panel having an opening;
- a stick shift disposed within the opening;
- a shifter housing disposed within the center console, the shifter housing configured to hold an electrical component, the shifter housing having a first shifter housing side wall spaced apart the first cover wall, the first shifter housing side wall having a second opening for providing access to the electrical component, and an elongated member outwardly from the first shifter housing side wall towards the first cover wall; and
- a seal disposed above the second opening, the seal engaged between the first cover wall and the elongated member so as to prevent water seeping though the opening from coming into contact with the electrical component.

15. The console assembly as set forth in claim 14, further including an opening disposed on the top panel, and a stick shift disposed within the opening, the stick shift operatively connected to the electrical component.

16. A console assembly comprising:
- a center console having a top panel, and a first cover wall, the top panel having an opening;
- a stick shift disposed within the opening;
- a shifter housing disposed within the center console, the shifter housing configured to hold an electrical component, the shifter housing having a first shifter housing side wall spaced apart the first cover wall, and an elongated member extends outwardly from the first shifter housing side wall towards the first cover wall; and
- a portion of carpet, the elongated member biasing the portion of carpet against the first cover wall, the portion of carpet including a bead disposed above the elongated member, the bead convex with respect to the side wall, the bead being a resilient member and biasing the portion of carpet against the first cover wall so as to prevent the portion of carpet from slipping past the elongated member.

* * * * *